(12) United States Patent
Fan et al.

(10) Patent No.: US 7,433,198 B2
(45) Date of Patent: Oct. 7, 2008

(54) COMPUTER ENCLOSURE WITH DISK DRIVE BRACKET

(75) Inventors: Chen-Lu Fan, Taipei Hsien (TW); Li-Ping Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/693,722

(22) Filed: Mar. 30, 2007

(65) Prior Publication Data

US 2008/0130218 A1   Jun. 5, 2008

(30) Foreign Application Priority Data

Dec. 1, 2006   (CN) .................... 2006 2 0016126 U

(51) Int. Cl.
*H05K 5/00*        (2006.01)

(52) U.S. Cl. .................. 361/752; 361/679; 361/681; 361/724; 361/740; 361/747; 361/759; 361/801; 361/810

(58) Field of Classification Search .......... 361/752, 361/679, 681–687, 724–728, 801, 810, 740, 361/747, 759; 323/223.1, 223.2
See application file for complete search history.

(56) References Cited

U.S. PATENT DOCUMENTS

| | | | | |
|---|---|---|---|---|
| 4,964,017 A * | 10/1990 | Jindrick et al. .............. 361/683 |
| 5,564,804 A * | 10/1996 | Gonzalez et al. ......... 312/223.2 |
| 5,706,173 A * | 1/1998 | Carney et al. ............... 361/740 |
| 6,105,090 A * | 8/2000 | Fosmo ......................... 710/302 |
| 6,138,839 A * | 10/2000 | Cranston et al. ......... 211/41.17 |
| 6,160,712 A * | 12/2000 | Itai et al. ...................... 361/759 |
| 6,222,725 B1 * | 4/2001 | Jo ................................ 361/683 |
| 6,239,979 B1 * | 5/2001 | Ruff ............................ 361/759 |
| 6,272,007 B1 * | 8/2001 | Kitlas et al. .................. 361/683 |
| 6,317,318 B1 * | 11/2001 | Kim ............................ 361/685 |
| 6,381,131 B1 * | 4/2002 | Liu et al. ..................... 361/685 |
| 6,404,624 B1 * | 6/2002 | Jeong .......................... 361/683 |
| 6,421,215 B1 * | 7/2002 | Bushue ...................... 361/93.1 |
| 6,425,028 B1 * | 7/2002 | Fosmo ........................ 710/302 |
| 6,490,153 B1 * | 12/2002 | Casebolt et al. ............. 361/685 |
| 6,529,373 B1 | 3/2003 | Liao et al. |
| 6,594,150 B2 * | 7/2003 | Creason et al. ............. 361/727 |
| 6,618,271 B1 * | 9/2003 | Erickson et al. ............. 361/818 |
| 6,639,807 B1 * | 10/2003 | Carney et al. ............... 361/759 |
| 6,714,409 B2 * | 3/2004 | Chen ........................... 361/685 |
| 6,778,381 B1 * | 8/2004 | Bolognia et al. ............ 361/681 |
| 6,842,348 B2 * | 1/2005 | Lee ............................. 361/796 |
| 6,856,514 B2 * | 2/2005 | Smith ......................... 361/726 |
| 7,017,875 B2 * | 3/2006 | Chen et al. .................. 248/300 |
| 7,057,903 B2 * | 6/2006 | Kuo ............................ 361/801 |
| 2002/0030976 A1 * | 3/2002 | Boe ............................. 361/752 |
| 2002/0033655 A1 * | 3/2002 | Chen ........................ 312/223.2 |
| 2002/0034065 A1 * | 3/2002 | Imamura .................... 361/683 |
| 2002/0041484 A1 * | 4/2002 | Lajara et al. ................ 361/687 |

(Continued)

*Primary Examiner*—Dean A. Reichard
*Assistant Examiner*—Xiaoliang Chen
(74) *Attorney, Agent, or Firm*—Frank R. Niranjan

(57) ABSTRACT

A computer enclosure includes a chassis (10), and a bracket (30) secured in the chassis. The bracket includes a holding portion (32) configured for receiving at least one disk drive therein and an expansion portion (34) configured for securing a PCI card (40) thereon. The expansion portion is integrally formed on an outside of the holding portion.

12 Claims, 2 DrawingSheets

U.S. PATENT DOCUMENTS

| | | | |
|---|---|---|---|
| 2002/0114145 A1* | 8/2002 | Ruff | 361/801 |
| 2003/0016496 A1* | 1/2003 | Kim et al. | 361/695 |
| 2003/0038566 A1* | 2/2003 | Qiu | 312/223.2 |
| 2003/0112594 A1* | 6/2003 | Smith | 361/684 |
| 2003/0184959 A1* | 10/2003 | Erickson et al. | 361/683 |
| 2003/0202322 A1* | 10/2003 | Chen | 361/685 |
| 2003/0206404 A1* | 11/2003 | Ruff | 361/759 |
| 2004/0014347 A1* | 1/2004 | Brewer | 439/296 |
| 2004/0057203 A1* | 3/2004 | Rabinovitz | 361/685 |
| 2004/0062013 A1* | 4/2004 | Kim et al. | 361/752 |
| 2004/0086332 A1* | 5/2004 | Smith | 403/374.3 |
| 2004/0113034 A1* | 6/2004 | Chen et al. | 248/300 |
| 2004/0136151 A1* | 7/2004 | Lin et al. | 361/683 |
| 2004/0143694 A1* | 7/2004 | Chen et al. | 710/309 |
| 2004/0201333 A1* | 10/2004 | Chen | 312/223.2 |
| 2005/0062375 A1* | 3/2005 | Chen et al. | 312/223.2 |
| 2005/0135051 A1* | 6/2005 | Chen et al. | 361/683 |
| 2005/0148228 A1* | 7/2005 | Jing et al. | 439/325 |
| 2006/0120170 A1* | 6/2006 | Chen et al. | 365/189.05 |
| 2006/0130083 A1* | 6/2006 | Cheng | 720/651 |
| 2006/0139870 A1* | 6/2006 | Chen et al. | 361/685 |
| 2006/0187632 A1* | 8/2006 | Chen et al. | 361/685 |
| 2007/0153467 A1* | 7/2007 | Chen et al. | 361/685 |
| 2007/0153469 A1* | 7/2007 | Chen et al. | 361/685 |
| 2007/0167071 A1* | 7/2007 | Peng et al. | 439/541.5 |

* cited by examiner

COMPUTER ENCLOSURE WITH DISK DRIVE BRACKET

BACKGROUND

1. Technical Field

The present invention relates to computer enclosures, and more particularly to a computer enclosure with a bracket for receiving disk drives.

2. General Background

In a computer or a sever, a disk drive is needed. A bracket is usually provided to secure the disk drive therein. However, the kind of bracket is only used to secure the disk drive, but cannot be used to secure other electronic devices, such as PCI (Peripheral Component Interconnection) cards.

What is needed, therefore, is a computer enclosure having a bracket for securing at least one disk drive therein and allowing a PCI card securing thereon.

SUMMARY

A computer enclosure includes a chassis, and a bracket secured in the chassis. The bracket includes a holding portion configured for receiving at least one disk drive therein and an expansion portion configured for securing a PCI card thereon. The expansion portion is integrally formed on an outside of the holding portion.

Other advantages and novel features will be drawn from the following detailed description of preferred embodiments with attached drawings, in which:

DETAILED DESCRIPTION OF PREFERRED EMBODIMENTS

Figure 1:
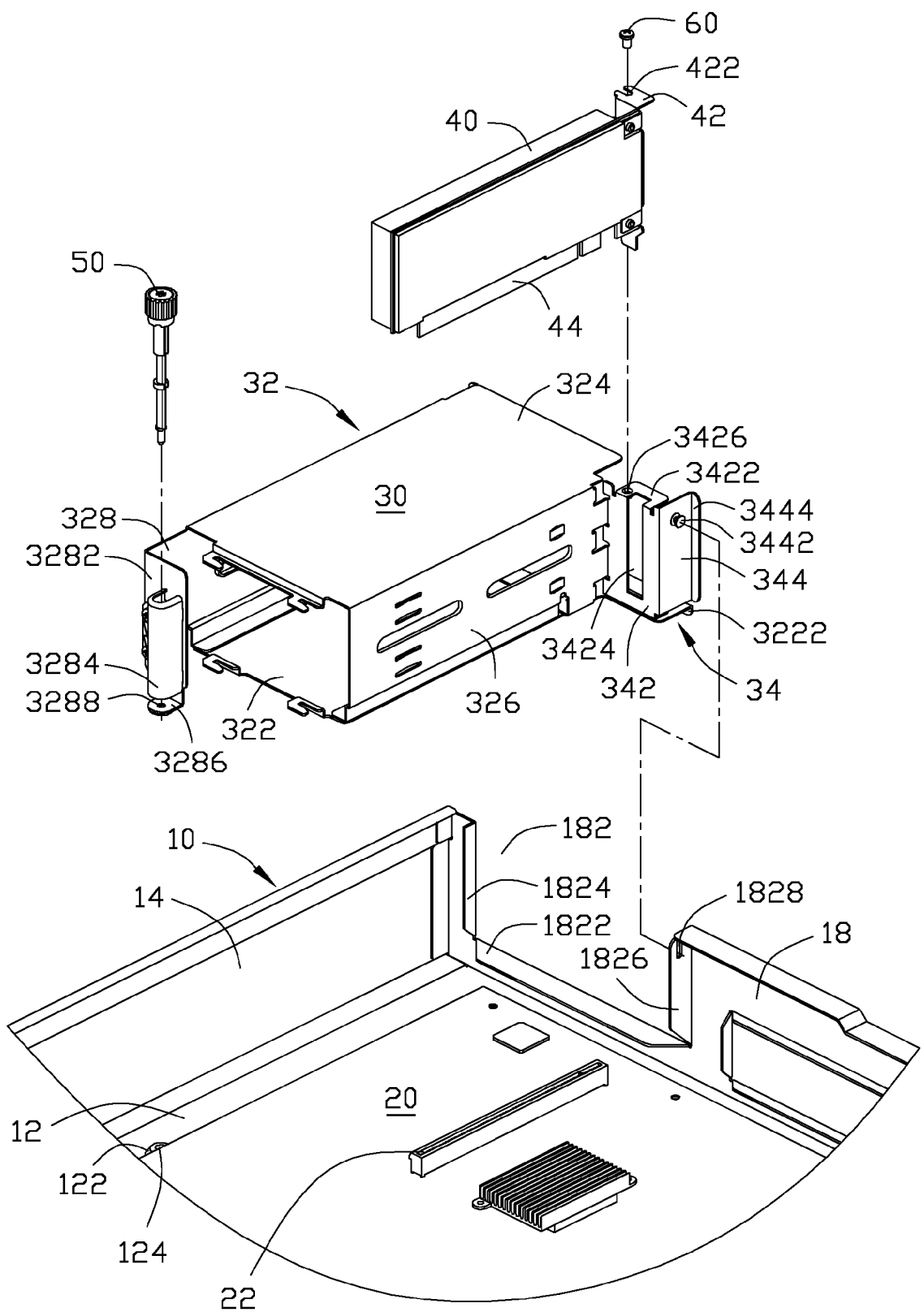
FIG. 1 is an exploded, isometric view of a preferred embodiment of the present invention, with a PCI card and a motherboard.

Referring to FIG. 1, a computer enclosure of a preferred embodiment of the present invention includes a chassis 10, and a bracket 30 detachably attached to the chassis 10.

The chassis 10 includes a bottom plate 12, a side plate 14, and a rear plate 18. The side plate 14 and the rear plate 18 are perpendicularly formed on adjacent edges of the bottom plate 12, and perpendicular to each other. A motherboard 20 is secured on an inner surface of the bottom plate 12. An expansion slot 22 is disposed on the motherboard 20 and extends along a direction perpendicular to the rear plate 18. A convex portion 122 with a mounting hole 124 defined therein is disposed on the inner surface of the bottom plate 12 between the motherboard 20 and the side plate 14. The rear plate 18 defines an opening 182 adjacent the side plate 14 thereof. Three bent flanges 1822, 1824, and 1826 are perpendicularly bent from a bottom and two side edges of the opening 182 respectively. A cutout 1828 is defined in a top portion of the bent flange 1826 along a direction perpendicular to the bottom plate 12.

The bracket 30 includes a holding portion 32 for receiving disk drives therein, and an expansion portion 34 extending from the holding portion 32. The holding portion 32 includes a bottom wall 322, a top wall 324 parallel to the bottom wall 322, and parallel first and second side walls 326, 328 both perpendicular to the bottom wall 322. A rim 3222 is perpendicularly bent down from a rear edge of the bottom wall 322. A bent piece 3282 is perpendicularly formed on a front edge of the second side wall 328 toward the first side wall 326. A hollow restricting portion 3284 is formed on an outer surface of the bent piece 3282. A positioning piece 3286 with a through hole 3288 defined therein is formed on the bent piece 3282 below the restricting portion 3284. The expansion portion 34 includes a first retaining wall 342 bent perpendicularly out from the first side wall 326 of the holding portion 32, and a second retaining wall 344 bent perpendicularly out from the first retaining wall 342. A support flange 3422 is perpendicularly formed on a top edge of the first retaining wall 342. A PCI opening 3424 is defined in the first retaining wall 342 and the support flange 3422. A securing hole 3426 is defined in the support flange 3422. A post 3442 is disposed on the second retaining wall 344, corresponding to the cutout 1828 of the bent flange 1826 of the rear plate 18. A rim 3444 is perpendicularly formed on a rear edge of the second retaining wall 344.

A PCI (peripheral component interconnection) card 40 has an L-shaped mounting piece 42 for securing the PCI card 40 on the expansion portion 344 of the bracket 30 and shielding the PCI opening 3424, and an inserting portion 44 for inserting into the expansion slot 22 of the motherboard 20. The mounting piece 42 defines a locking hole 422 therein, corresponding to the securing hole 3426 of the expansion portion 344 of the bracket 30. Alternatively, other expansion cards can also be used.

Figure 2:
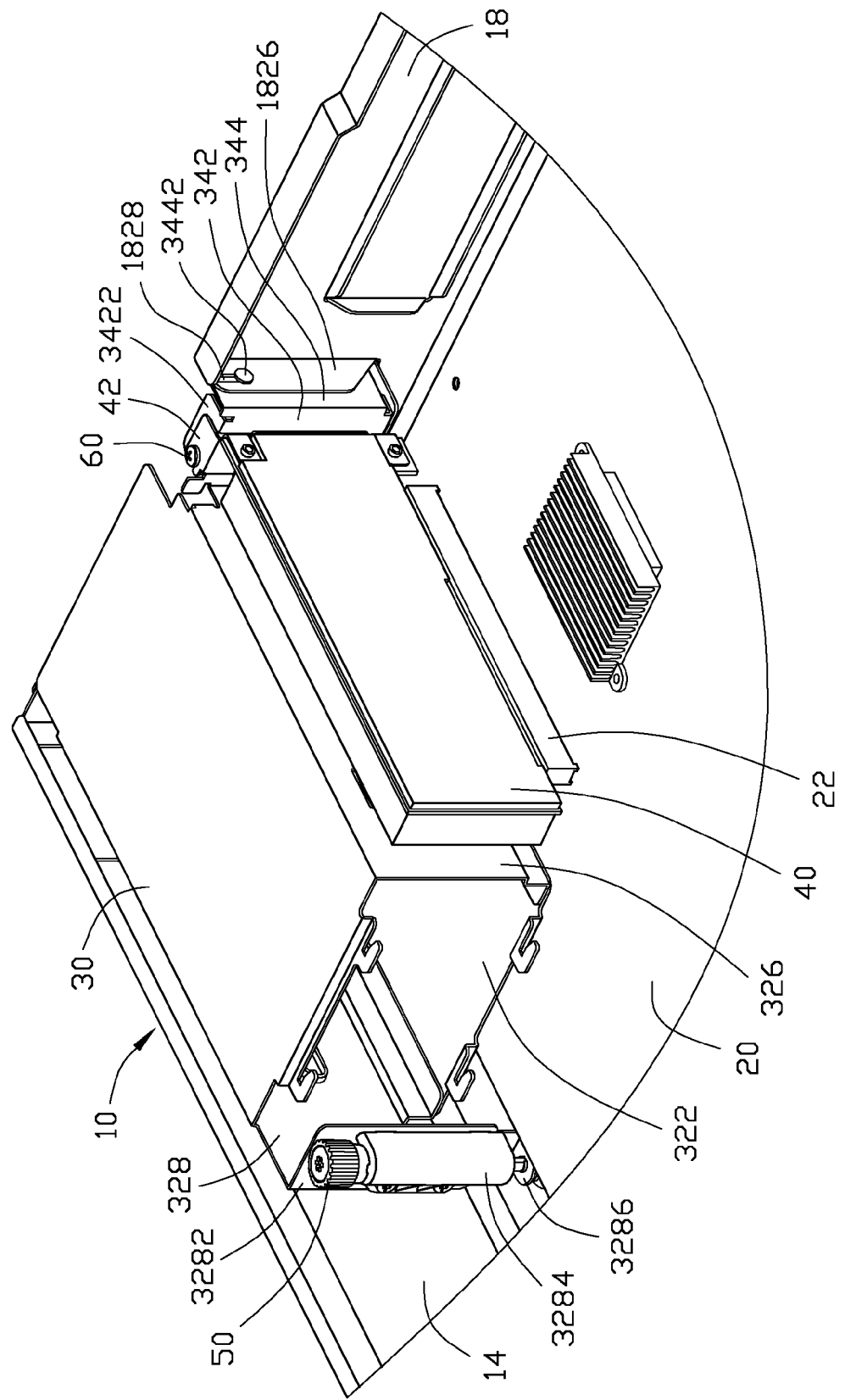
FIG. 2 is an assembled view of FIG. 1.

See FIG. 2, the bracket 30 is placed into the chassis 10 with the rear end thereof being received into the opening 182 of the rear plate 18. The post 3442 of the bracket 30 is slid into the cutout 1828 of the rear plate 18. The positioning piece 3286 of the second side wall 328 is located above the convex portion 122 of the bottom plate 12, and the through hole 3288 aligns with the mounting hole 124 of the convex portion 122. The bottom wall 322 is supported on the bent flange 1822 of the rear plate 18, and the second side wall 328 abuts on the bent flange 1824, and the end of the rim 3222 abuts on the bent flange 1826. The rims 3222, 3444 are positioned at the exterior of the chassis 10 and abut an outer surface of the rear plate 18. A locking member 50, such as an elongated thumb-screw, is inserted through the restricting portion 3284 and the through hole 3288 of the positioning piece 3286 thereby being locked into the mounting hole 124 of the convex portion 122 of the bottom plate 12. Thus, the bracket 30 is stably secured into the chassis 10.

The inserting portion 44 of the PCI card 40 is inserted into the PCI slot 22 of the motherboard 20. The mounting piece 42 is inserted into the PCI opening 3424 of the first retaining wall 342 of the expansion portion 342 with a top portion thereof abutting on the top portion of the support flange 3422. The locking hole 422 aligns with the securing hole 3426 of the support flange 3422 of the first retaining wall 342. A screw 60 is inserted through the locking hole 422 of the mounting piece 42 of the PCI card 40, and locked into the securing hole 3426 of the first retaining wall 342. Thus, the PCI card 40 is stably secured into the chassis 10 on the expansion portion 34 of the bracket 30.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure comprising:
   a PCI card;
   a chassis; and
   a bracket secured in the chassis, the bracket comprising a holding portion and an expansion portion, the holding portion having a bottom wall, a top wall parallel to the bottom wall, and parallel first and second side walls both perpendicular to the bottom wall, the bottom wall, the top wall and the first and second side walls together forming a space for receiving at least one disk drive therein, the expansion portion securing the PCI card thereon, the expansion portion being integrally formed on an outside of the space of the holding portion;
   wherein the expansion portion of the bracket comprises a first retaining wall extending from the holding portion and a second retaining wall perpendicularly bent from the first retaining wall and slidably attached to the chassis, the first retaining wall being perpendicular to the bottom wall, the top wall, and the first and second side walls;
   wherein the chassis comprises a rear plate, the rear plate defining an opening for receiving one end of the bracket therein;
   wherein the chassis comprises a bottom plate perpendicular to the rear plate, a convex portion with a mounting hole defined therein being disposed on the bottom plate, a positioning piece with a through hole defined therein being formed on the holding portion of the bracket, a locking member being inserted through the through hole to lock into the mounting hole so that the bracket is stably secured in the chassis.

2. The computer enclosure as described in claim 1, wherein a support flange is bent from the first retaining wall of the expansion portion for a mounting piece of the PCI card supported thereon, the support flange defining a securing hole therein for a screw being locked thereinto via a locking hole defined in the mounting piece of the PCI card.

3. The computer enclosure as described in claim 1, wherein a bent flange is perpendicularly formed on an edge of the opening of the rear plate and parallel to the second retaining wall of the expansion portion of the bracket.

4. The computer enclosure as described in claim 3, wherein the bent flange defines a cutout therein, a post being disposed on the second retaining wall of the expansion portion in order to slide into the cutout of the bent flange of the rear plate to position the bracket into the opening of the rear plate when the bracket is secured into the chassis.

5. The computer enclosure as described in claim 1, wherein a hollow restricting portion is formed on the holding portion of the bracket above the positioning piece for the locking member inserting therethrough.

6. A computer enclosure comprising:
   a chassis comprising a bottom plate and a rear plate perpendicular to the bottom plate, the bottom plate forming a mounting member thereat, the rear plate defining a cutout therein;
   a bracket comprising a holding portion for securing at least one disk drive therein and an expansion portion formed on an outside of the holding portion, the expansion portion comprising a first retaining wall parallel to the rear plate of the chassis and perpendicular to the rear plate for securing a PCI card thereon, and a second retaining wall perpendicularly bent from the first retaining wall and perpendicular to the bottom plate and the rear plate of the chassis, a positioning piece with a through hole defined therein being formed on the holding portion, a post being formed on the second retaining wall of the expansion portion of the bracket to slide into the cutout of the rear plate for positioning the bracket to the chassis; and
   a locking member being inserted through the through hole of the positioning piece of the bracket and locked into the mounting member of the bottom plate thereby fastening the bracket in the chassis;
   wherein a hollow restricting portion is formed on the holding portion of the bracket above the positioning piece for the locking member inserting therethrough.

7. The computer enclosure as described in claim 6, wherein a support flange is bent from the first retaining wall of the expansion portion for a mounting piece of the PCI card supported thereon, the support flange defining a securing hole therein for a screw locked thereinto via a locking hole defined in the mounting piece of the PCI card.

8. The computer enclosure as described in claim 6, wherein the rear plate defines an opening for receiving the bracket therein, a bent flange being perpendicularly formed on an edge of the opening of the rear plate and parallel to the second retaining wall of the expansion portion of the bracket, the bent flange defining the cutout therein.

9. A computer comprising:
   a chassis comprising a bottom plate and a pair of side plates perpendicular to one another, a motherboard being mounted on the bottom plate, an expansion slot being provided on the motherboard;
   a bracket comprising a holding portion fixed to the chassis, and an expansion portion integrally extending from the holding portion and slidably attached to the chassis, the holding portion defining a space communicating with outside of the chassis;
   at least one disk drive secured into the space of the holding portion of the bracket from the outside of the chassis; and
   an expansion card comprising an inserting portion inserted into the expansion slot and a mounting piece secured to the expansion portion of the bracket;
   wherein one of the side plates of the chassis defines an opening with flanges extending inward from edges of the opening, and one end of the bracket is received in the opening and the flanges abut against the end of the bracket to position the bracket in the chassis.

10. The computer as described in claim 9, wherein a screw hole is defined in the bottom plate, a through hole is defined at an opposite end of the bracket, and a fastener extends through the through hole to be locked in the screw hole thereby fixing the bracket to the chassis.

11. The computer enclosure as described in claim 9, wherein the bracket comprises a bottom wall and a pair of side walls extending perpendicularly from opposite side edges of the bottom wall, the bottom wall abutting against one of the flanges of chassis adjacent to the bottom plate, one of the side walls abutting against one of the flanges of the chassis adjacent to the other one of the side plates, the expansion portion integrally extending from one end of the other one of the side walls.

12. The computer as described in claim 11, wherein the expansion portion comprises a first retaining wall extending from said one end of the other one of the side walls and covering one portion of the opening, and a second retaining wall extending from a distal end of the first retaining wall and facing another one of the flanges which defines a cutout, the mounting piece of the expansion card being fixed to the first retaining wall, a post being secured on the second retaining wall and slidably received in the cutout.

* * * * *